United States Patent
Boffo et al.

(10) Patent No.: US 9,899,894 B2
(45) Date of Patent: Feb. 20, 2018

(54) SCALABLE DEVICE AND ARRANGEMENT FOR STORING AND RELEASING ENERGY

(75) Inventors: Cristian Boffo, Wuerzburg (DE);
Jochen Steinmann, Wuerzburg (DE);
Wolfgang Walter, Wuerzburg (DE);
Philipp Revilak, Wuerzburg (DE);
Johannes Amend, Rottendorf (DE);
Hilmar Zoeller, Werneck-Essleben (DE)

(73) Assignee: Babcock Noell GmbH, Wuerzburg (DE)

( * ) Notice: Subject to any disclaimer, the term of this patent is extended or adjusted under 35 U.S.C. 154(b) by 463 days.

(21) Appl. No.: 14/390,290

(22) PCT Filed: Apr. 3, 2012

(86) PCT No.: PCT/EP2012/001471
§ 371 (c)(1),
(2), (4) Date: Oct. 2, 2014

(87) PCT Pub. No.: WO2013/149627
PCT Pub. Date: Oct. 10, 2013

(65) Prior Publication Data
US 2015/0054366 A1 Feb. 26, 2015

(51) Int. Cl.
*H02K 7/02* (2006.01)
*H02K 7/09* (2006.01)
(Continued)

(52) U.S. Cl.
CPC ......... *H02K 7/025* (2013.01); *F16C 32/0438* (2013.01); *H02K 5/22* (2013.01);
(Continued)

(58) Field of Classification Search
CPC .................. H02K 7/025; F16C 32/04
(Continued)

(56) References Cited

U.S. PATENT DOCUMENTS 3,862,444 A * 1/1975 Hale .................. H02K 7/11
192/18 R
6,043,577 A 3/2000 Bornemann et al.
(Continued)

FOREIGN PATENT DOCUMENTS

CN 201656687 U 11/2010
DE 42 00 824 A1 7/1993
(Continued)

OTHER PUBLICATIONS

International Search Report of PCT/EP2012/001471, dated Jan. 31, 2013.
Canadian Office Action in CA 2,875,270 dated Apr. 1, 2016.
Chinese Office Action in CN 201280073288.4 dated Apr. 19, 2016.

*Primary Examiner* — Jose Gonzalez Quinones
(74) *Attorney, Agent, or Firm* — Collard & Roe, P.C.

(57) ABSTRACT

The invention relates to a scalable device for storing and releasing energy, consisting of a housing that can be evacuated, a vacuum (12), at least one flywheel mass (2) on a shaft (17), at least one passive superconducting radial bearing and an electrical machine (24) that constitutes both a motor and a generator, wherein a cold surface is arranged in the vacuum container (11) for stabilizing the vacuum (12). The invention has the advantage that an energy store is provided that operates efficiently and cost-effectively with minimized energy losses, is scalable and also has sufficient safety elements to enable it to be used in industrial environments.

15 Claims, 8 Drawing Sheets

Figure 1:
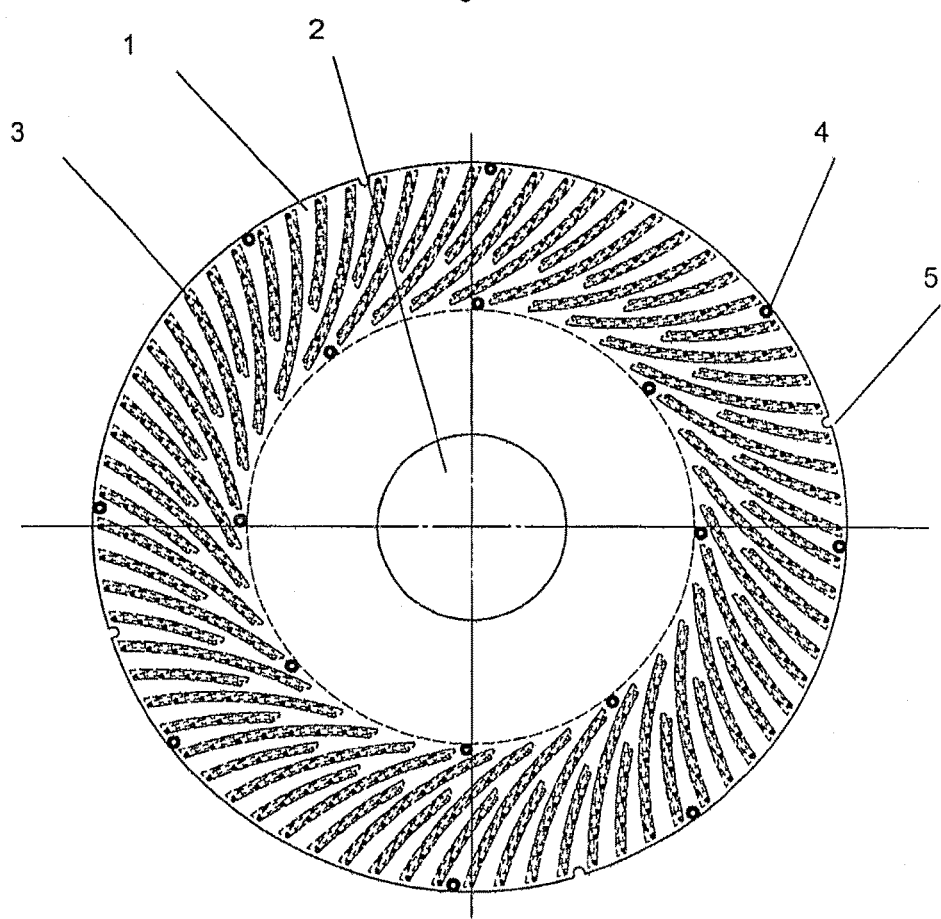

(51) Int. Cl.

| | | |
|---|---|---|
| *H02K 23/60* | (2006.01) | |
| *H02K 1/27* | (2006.01) | |
| *H02K 5/24* | (2006.01) | |
| *F16C 32/04* | (2006.01) | |
| *H02K 5/22* | (2006.01) | |

(52) U.S. Cl.
CPC ................. *H02K 5/24* (2013.01); *H02K 7/09* (2013.01); *F16C 2361/55* (2013.01); *Y02E 60/16* (2013.01)

(58) Field of Classification Search
USPC .................................. 310/74, 90.5, 115, 178
See application file for complete search history.

(56) References Cited

U.S. PATENT DOCUMENTS

| 6,236,127 B1 | 5/2001 | Bornemann | |
|---|---|---|---|
| 2010/0001697 A1* | 1/2010 | Hsu .................. | H02K 7/025 322/4 |

FOREIGN PATENT DOCUMENTS

| DE | 197 09 674 C1 | | 2/1998 | |
|---|---|---|---|---|
| DE | 196 43 844 C1 | | 5/1998 | |
| EP | 2 237 397 A1 | | 10/2010 | |
| GB | 2 305 992 A | | 4/1997 | |
| JP | 08098454 A | * | 4/1996 | |
| JP | 11074114 A | * | 3/1999 | .......... F16C 32/0438 |
| JP | 2001099156 A | * | 4/2001 | .......... F16C 32/0438 |

\* cited by examiner

SCALABLE DEVICE AND ARRANGEMENT FOR STORING AND RELEASING ENERGY

CROSS REFERENCE TO RELATED APPLICATIONS

This application is the National Stage of PCT/EP2012/001471 filed on Apr. 3, 2012, the disclosure of which is incorporated by reference. The international application under PCT article 21(2) was not published in English.

The invention relates to an apparatus according to the preamble of the first claim.

The invention can be used everywhere where energy stored in cost-advantageous manner is supposed to be made available within a short period of time.

Storage of energy is one of the most important questions for modern society, within the course of developing new energy sources, because the stability of the power grid depends in large part on the balance between the energy fed in and the energy called on. Renewable energies, such as solar energy and wind energy, produce energy but do so only inconsistently. Therefore the fundamental question arises as to how energy can be sensibly stored in phases of excess production, in order to feed this energy back into the grid during a time of insufficient production, without great losses. The invention offers a solution for this. A further application is what is called Power Quality. Even brief variations in the power grid can damage sensitive electrical equipment in industry, research, and medicine, or can lead to extended down times, because such machines have protective mechanisms that shut them down in such cases. Startup of the machines can take several hours and can lead to significant economic losses. An invention such as that proposed here can precede such a machine and compensate for failures in the power grid, so that these protective mechanisms do not have to be triggered in the first place. A further application of the invention is in the sector of what are called UPS [Uninterruptible Power Supply] systems. These are failure-protected power networks. In this connection, the invention can either make the stored energy available until the failure has been corrected, or can replace a further emergency power source, such as that represented by diesel generators, for example, and take over further supply to the network.

For the fundamental provision of energy, concepts such as pump storage power plants or compressed air energy storage units are discussed; in the sector of Power Quality, there are currently no products used as a standard, and in the sector of UPS systems, either chemical batteries (rechargeable batteries) or conventional flywheel storage units are used.

The following examples are listed with regard to the prior art:

DE 197 09 674 C1 describes an apparatus for storing and releasing energy, consisting of a housing that can be evacuated with a vacuum, and superconducting planar bearings, wherein multiple flywheel masses can be affixed in a complex structure, DE 42 00 824 A1 describes an electrodynamic flywheel storage unit in which the rotor shaft has a planned breaking point, which lies outside of a mounting of the rotor.

EP 237 397 A1 describes an apparatus and an arrangement for storing and releasing energy, wherein the flywheel storage unit has multiple electrical machines.

GB 2 305 992 A describes an apparatus and an arrangement for storing and releasing energy, having a housing that can be evacuated with vacuum, and a flywheel mass, wherein a safety container is connected with the holding structure of the vacuum container in free-running manner.

Storage concepts such as pump storage units or compressed air storage units represent very large, complicated systems, which are very expensive. They are therefore suitable only for storing very large amounts of energy; furthermore, the concepts are greatly dependent on local geographic conditions, and therefore cannot be used everywhere. The batteries most widespread in the UPS sector are mostly rechargeable lead batteries, and therefore are complicated to dispose of and not environmentally friendly. Furthermore, batteries are generally dimensioned to be oversized, because power and running time are coupled. If there is any lack of clarity concerning the ability to be used, these must be replaced. Conventional flywheel storage units are generally not mounted in contact-free manner, and have great energy losses as the result of the friction that occurs. Current flywheel storage units available on the market, with magnetic mounting, are dependent on additional active control of the system for its stabilization. Concepts for implementing friction-free flywheel storage units, which are based on superconductive mounting, as in DE19709674C1 or DE19643844C1, have frequently been proposed, but it was never possible to actually use them in systems. This is due, for example, to safety aspects in breakdowns, such as vacuum tightness, or if parts of the flywheel mass come loose at high speeds of rotation and thereby turn into projectiles.

Furthermore, the systems generally have a complex structure and can be scaled only with difficulty.

It is therefore the task of the invention to develop an apparatus based on a flywheel, for storing energy, which apparatus can be scaled for different applications in terms of its size, power, storage capacity, and safety provisions, and which works with very low losses, by means of contact-free magnetic passive mounting.

Furthermore, the invention is supposed to represent a cost-advantageous alternative to current energy storage concepts, which is flexible in use.

This task is accomplished by means of an apparatus according to the characteristics of the first claim.

The dependent claims reproduce advantageous embodiments of the invention.

The solution according to the invention consists of a scalable apparatus for storing and releasing energy, consisting of a container that can be evacuated, such as a vacuum container, of a vacuum, of at least one flywheel mass on a shaft, at least one passive superconducting radial bearing, such as a radial bearing, and of an electrical machine that represents both a generator and a motor.

The system therefore consists of a shaft that stands perpendicular, on which the flywheel mass and rotor units of the bearings and of the electrical machine are disposed. Furthermore, an electrical machine is disposed in the system, which can drive not only the shaft but also the motor, and, as a generator, can also supply the system with its energy. Furthermore, the system has two superconducting bearings close to the ends of the shaft, which allow friction-free rotation of the shaft. It is advantageous for cooling the bearings and for reducing the friction resistance of the rotor to operate the system at reduced pressure, or, even better, in a vacuum. For this purpose, the system must be situated in a container. Furthermore, a safety container, which is supposed to prevent greatly accelerated particles from exiting from the system, is disposed in the system. Furthermore, in the event of a problem during which contact with the flywheel mass occurs, the safety container is supposed to help reduce the energy of the flywheel mass. The safety container consists of an upper and a lower cover element, between which one or more fixation elements is/are disposed, which elements have recesses for lamellae. These can consist of metallic or fiber composite materials. Lamellae are inserted into the recesses. These end close to the rings. The lamellae can be composed either of one piece or of individual elements. These elements can be connected by way of joints, in such a manner that they have the form of a reinforced dome. The elements can consist of metallic or fiber composite materials. Furthermore, these elements can consist of a block, or they can have a cavity. Further materials can also be introduced into the fill volume of the cavity of the lamellae, as used for braking of projectiles. Furthermore, damping materials, such as soft metals, fiber composite materials or polymers can be introduced between the lamella and the fixation elements. Cover rings, which are screwed together with the other parts by way of connecting rods, are disposed above and below the arrangement. The entire safety container can either be firmly connected with the chamber, in that it can be set into a holding structure, for example, or it can be inserted in free-running manner. Then it can rotate with the flywheel mass when it makes contact with it.

The safety container can also be composed of individual segments of the fixation elements or of the upper and lower cover plate.

A cold surface is provided in the system. This supports the vacuum in the container, because parts of the residual gas in the container can freeze onto it. Also in the event that air flows into the vacuum through a leak in the container, this surface can slow down the increase in pressure in the system in such a manner that the system can be shut down. In this way, a permanent connection to a vacuum pump can be avoided, which reduces the costs. The cold surface is connected, by means of a connecting element that utilizes either conduction, convection or the thermoacoustic effect for heat transfer, either directly with a cold source or with the Cooling mantle of the superconducting bearings. The side facing the outer wall can be insulated from the introduction of heat by means of radiation, using reflective means. Furthermore, for faster heating of the system, heating of the surface by means of a wire to which current is applied, for example, can be provided.

Either one or more cryocoolers or chambers that are filled with a cryogenic agent, for example liquid nitrogen, can be used as a cold source for the system. In this connection, the chamber can additionally be connected also with an external cryogenic circuit, or cooled by means of a cryocooler. The cold surface can lie radially relative to the superconducting bearing, for example, preferably in a tight connection to same.

The flywheel mass of the system preferably consists of CFC. In this way, it is ensured that it withstands higher speeds of rotation. However, the flywheel mass can also be composed of other fiber composite materials.

Two superconducting bearings are used for friction-free mounting of the system. However, a combination of a superconducting bearing and a permanent magnet bearing can also be used.

The superconducting bearing is a radial bearing that demonstrates not only axial but also radial rigidity. Furthermore, the superconducting bearing has the advantage that it acts passively, in other words without active control, in other words it imparts stability to the system solely on the basis of its physical properties. This is not possible with an arrangement composed only of permanent magnet bearings.

The superconducting bearing brings stability into the system. During cooling, the magnetic field of the counterpiece on the rotor side, composed of permanent magnets is frozen, into the structure of the high-temperature superconductor. Any change in the latter, in other words any movement of the rotor out of its position, is opposed by a force from the magnetic bearing. In this way, the rotor is stabilized in its position. Preferably, YTTRIUM BARIUM COPPER OXIDE as a solid material is used as a superconducting material. However, copper oxide ceramics with other rare earths can also be used (RARE EARTH BARIUM COPPER OXIDE), or materials such as bismuth strontium calcium copper oxide, or magnesium diborides. Because the superconducting bearing must be cooled, it is advantageous to separate it spatially from the electrical machine and the main bearing, because heat is generated in the machine, which heat impairs the ability of the material as a superconducting bearing to function. The bearings are connected, by way of suitable means that utilize conduction, convection or the thermoacoustic effect for heat transfer, with a cold source. This can be done, in the simplest case, by means of a cable made of copper.

Furthermore, it is advantageous to structure the rotor-side bearing components as external rotors, because they are pressed against the structure by means of the centrifugal force that occurs.

In the embodiment as an external rotor, these do not need to be glued and bandaged in complicated manner.

If they are structured as internal rotors, they must be glued in place and bandaged.

The bearing can be structured not only as an internal rotor but also as an external rotor. Furthermore, the bearings, like the cold surface, can be equipped with a heating unit that accelerates heating for maintenance purposes.

If it should be necessary for scaling, further small bearings can be disposed along the shaft for stabilization.

The electrical machine serves the system not only as a motor but also as a generator, and thereby regulates both incoming and outgoing energy of the system. It can be structured not only as an electrical machine with permanent magnets on the rotor but also without permanent magnets on the rotor. The latter variant is preferred in the case of applications in which the flywheel is in idle for a long time, because losses caused by eddy currents can be reduced in this way. Either air, water, oil or a different fluid can be used for cooling of the stator of the electrical machine. A means that makes use of the thermoacoustic effect for heat transport can also be used. The electrical machine can be disposed above or below the flywheel mass, but must be situated between the two superconducting bearings.

A machine can be divided up in such a manner that it is situated not only above but also below the flywheel mass. In this manner, more than one machine can be disposed in the system.

In general, arrangements that make symmetry relative to the plane of the flywheel mass available are preferred.

The electrical machine can be structured not only as an internal rotor but also as an external rotor. In the case of the external rotor, it can actually be integrated into the flywheel mass.

By means of this structure of the system, an energy storage unit is made available that works efficiently and cost-advantageously, with minimized energy losses, is scalable, and also has enough safety elements so that it can be used in industrial environments.

In the following, the invention will be explained in greater detail using seven figures and an exemplary embodiment. The figures show:

FIG. 1: View from above of the fixation element with lamellae composed of individual elements FIG. 2: Enlargement of a detail of FIG. 1

Figure 3:
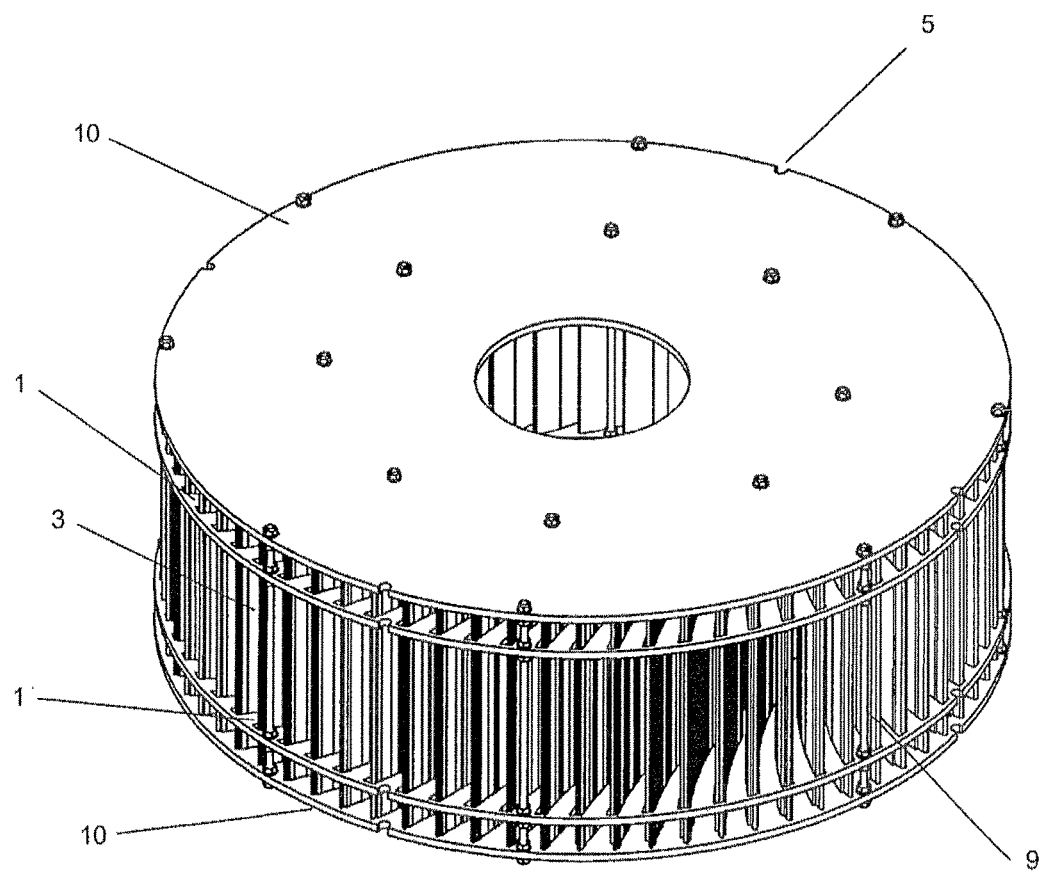

FIG. 3: Perspective representation of the safety container

Figure 4:
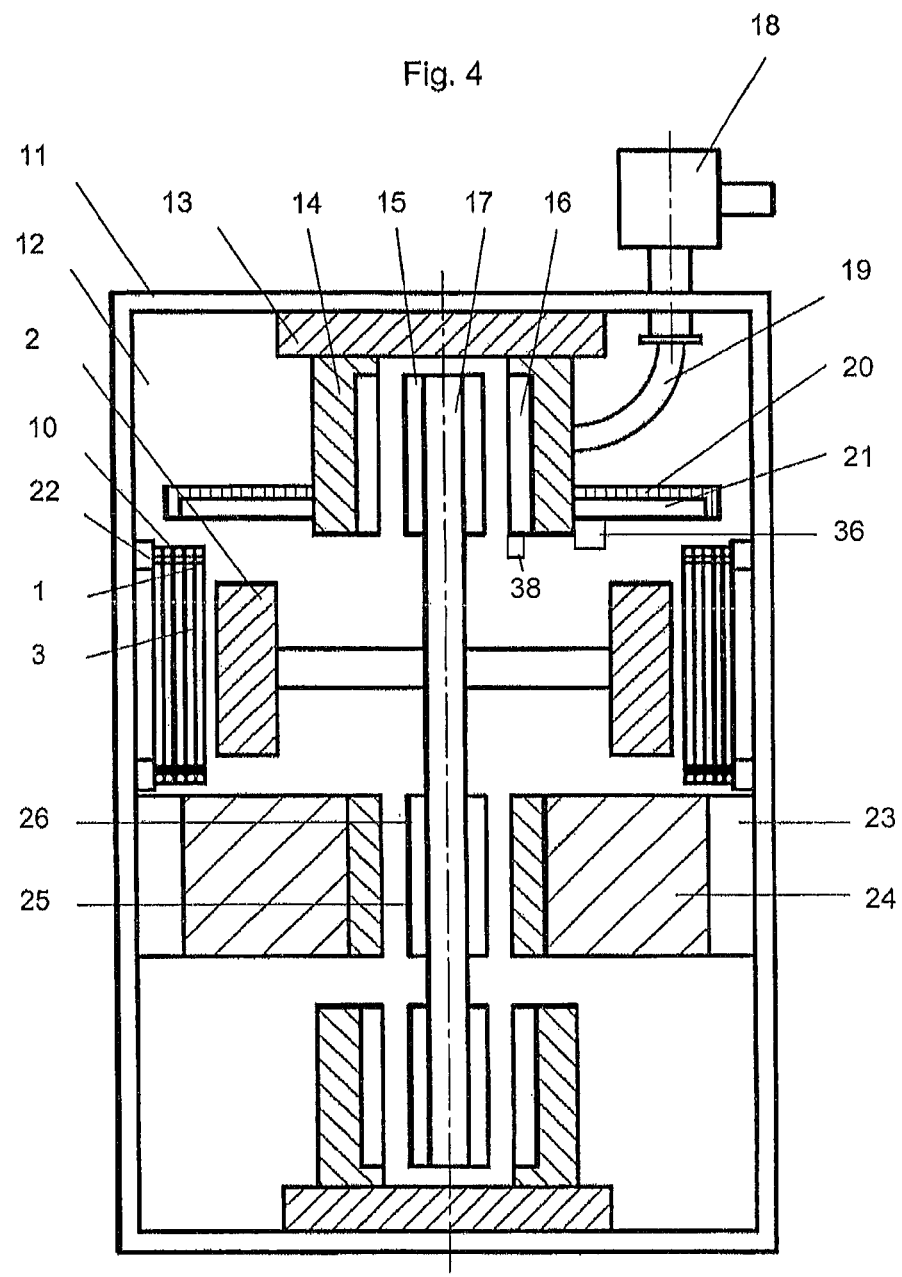

FIG. 4: Schematic representation of the solution according to the invention as a flywheel storage unit, whereby the rotor units are structured as internal rotors with cryocoolers.

Figure 5:
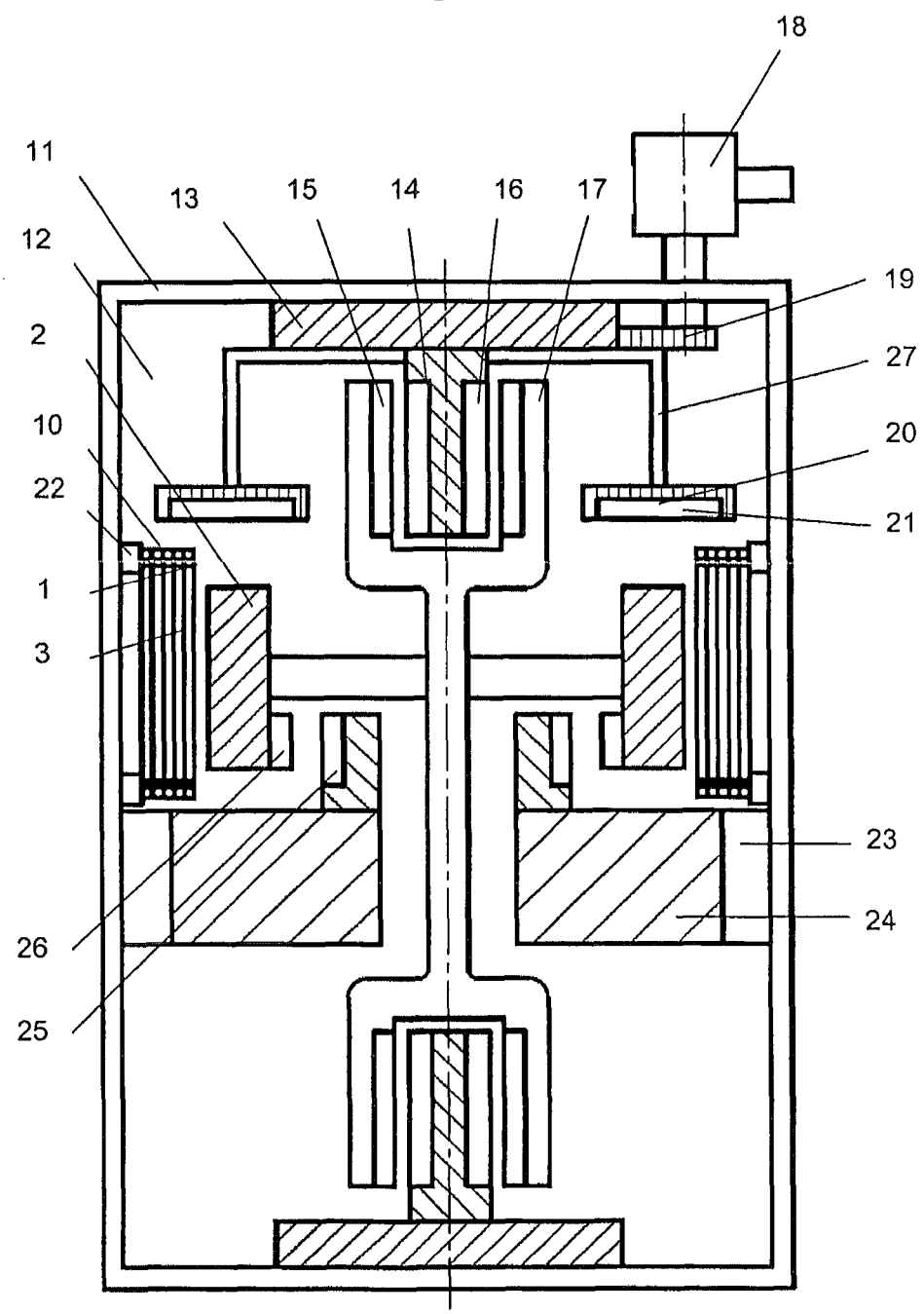

FIG. 5: Schematic representation of the solution according to the invention as a flywheel storage unit, whereby the rotor units are structured as external rotors with cryocoolers.

Figure 6:
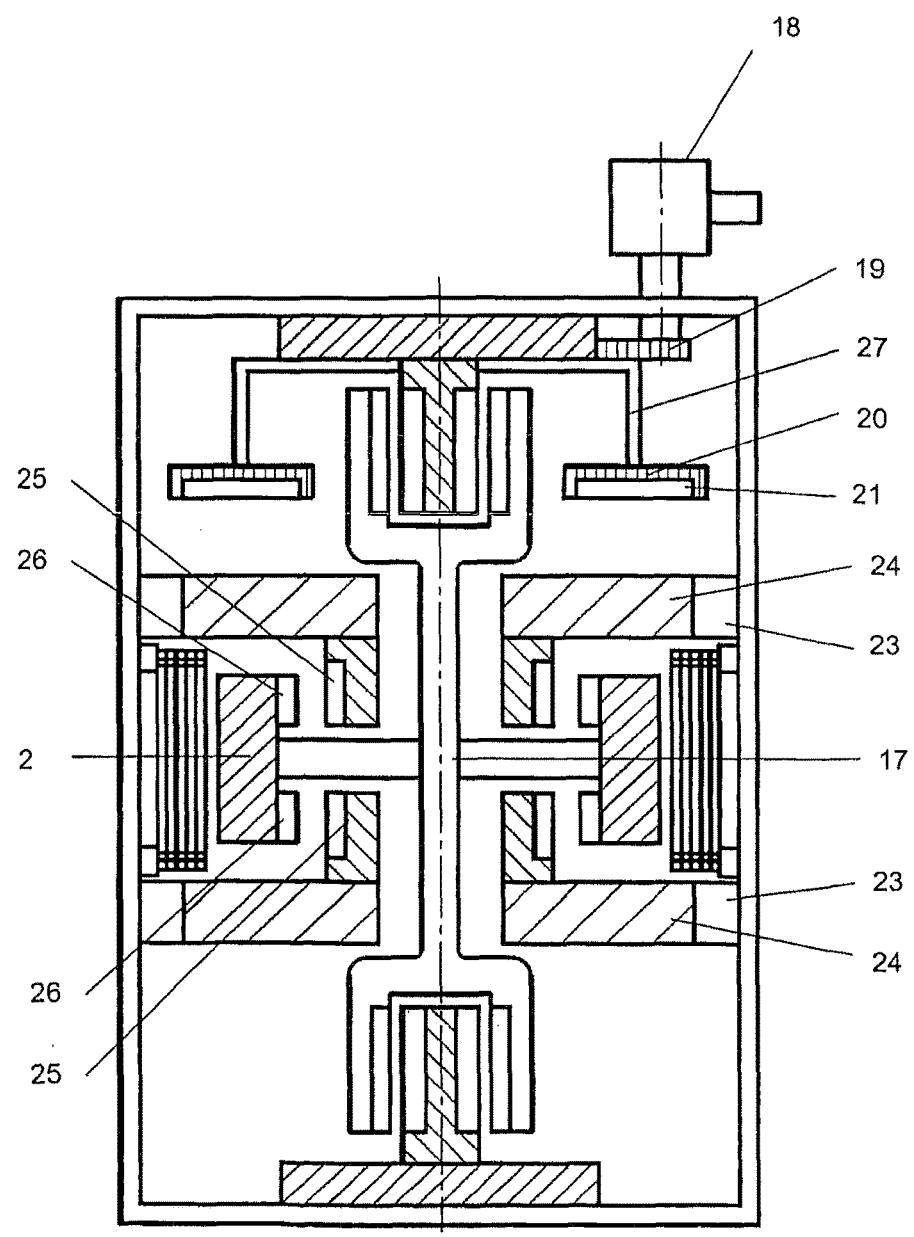

FIG. 6: Schematic representation of the solution according to the invention as a flywheel storage unit, whereby the rotor units are structured as external rotors with cryocoolers with two motors.

Figure 7:
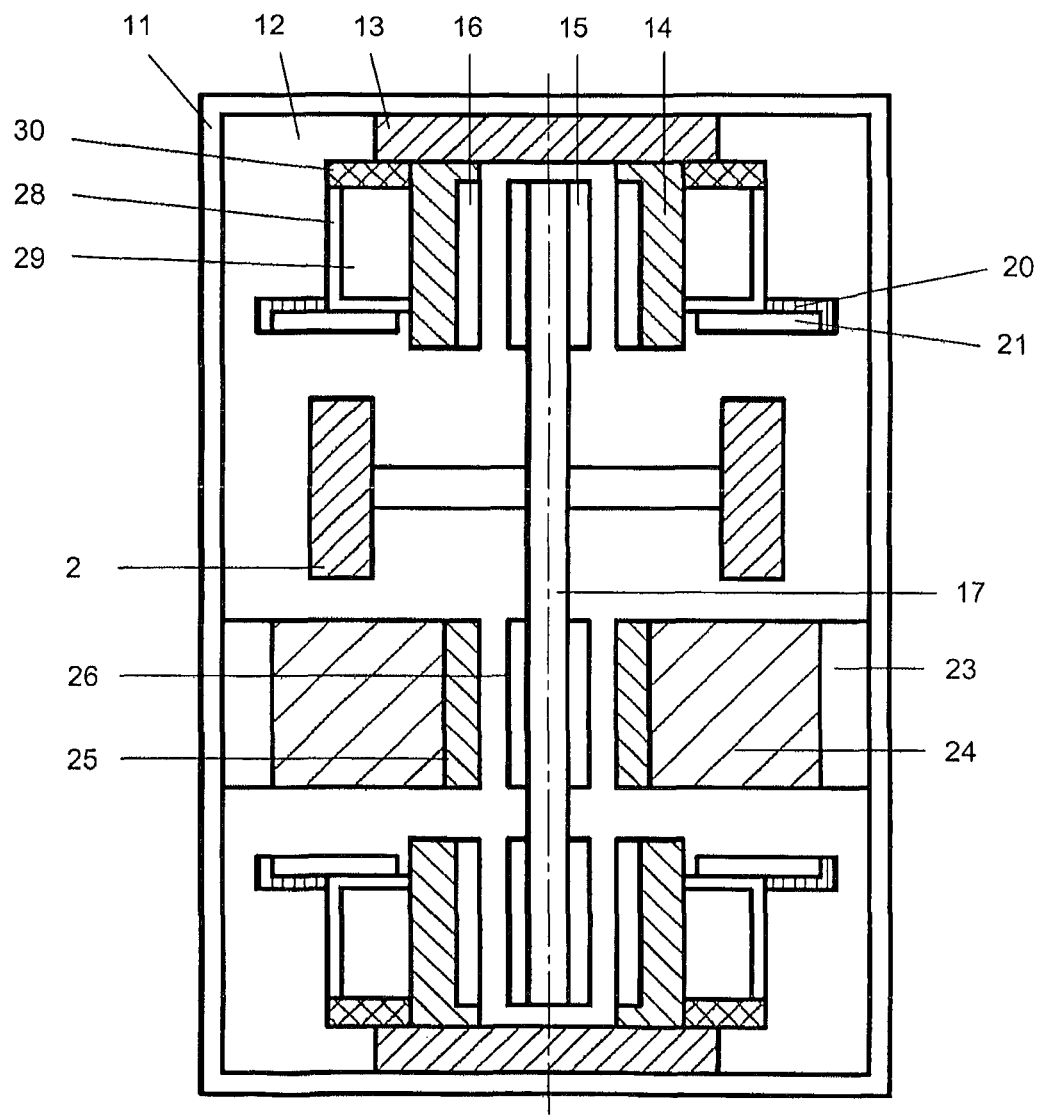

FIG. 7: Schematic representation of the solution according to the invention as a flywheel storage unit without a safety container, whereby the rotor units are structured as internal rotors with cooling by means of a cryogenic agent.

Figure 8:
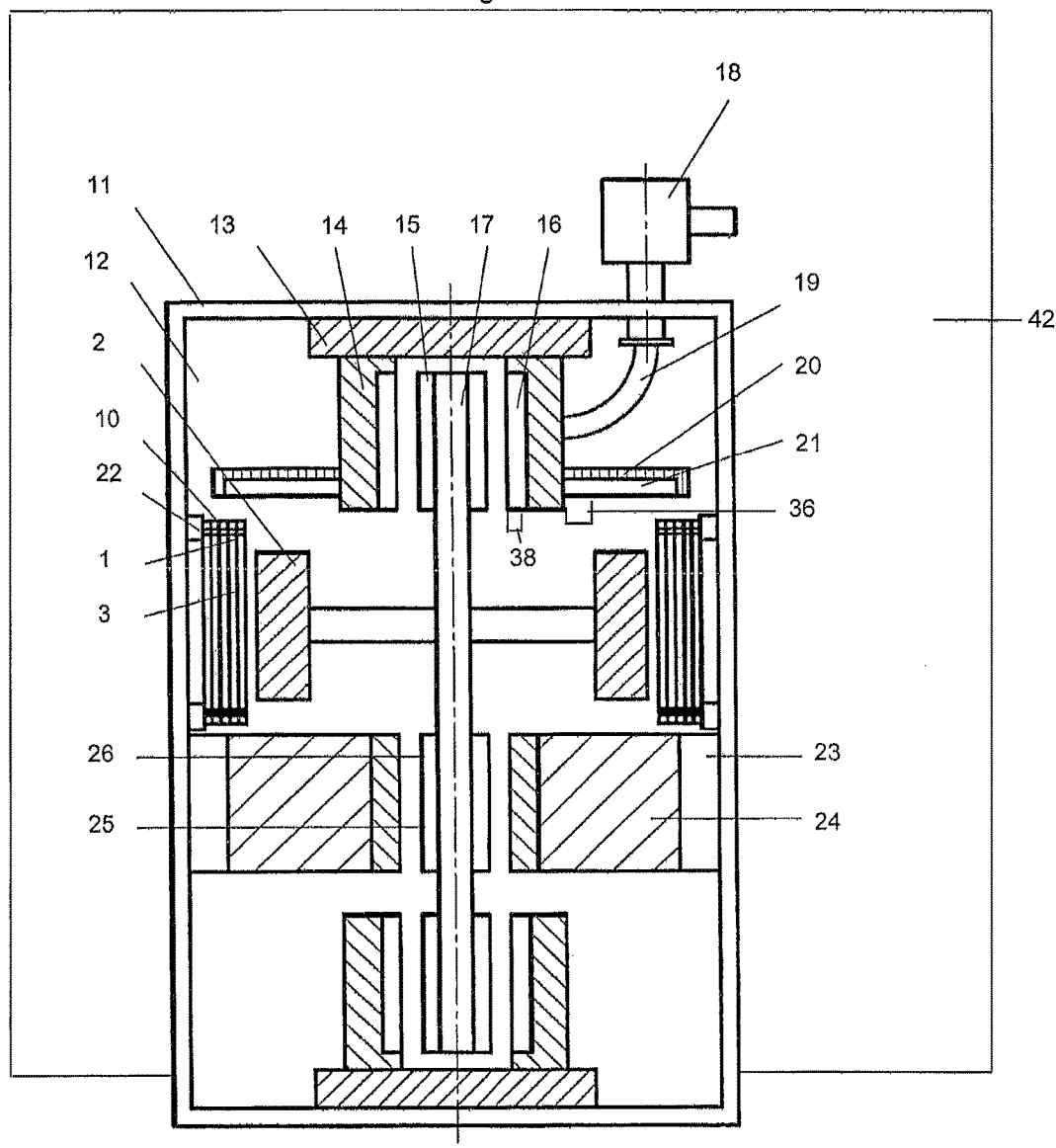

FIG. 8: Schematic representation of the flywheel storage unit according to FIG. 4 supplemented with an external structure that suppresses undesired vibration modes of the system.

FIG. 1 shows, in a view from above, the fixation element 1 with lamellae 3 in the recesses of the fixation element 1, whereby the lamellae 3 are disposed in arc shape and consist of individual elements. The ring-shaped fixation element 1 forms a ring around the flywheel mass 2 and is supposed to prevent parts of it from getting to the outside. The fixation element 1 has holes 4 for the connecting rods and recesses 5, so that the safety apparatus can be inserted into a holding structure.

Figure 2:
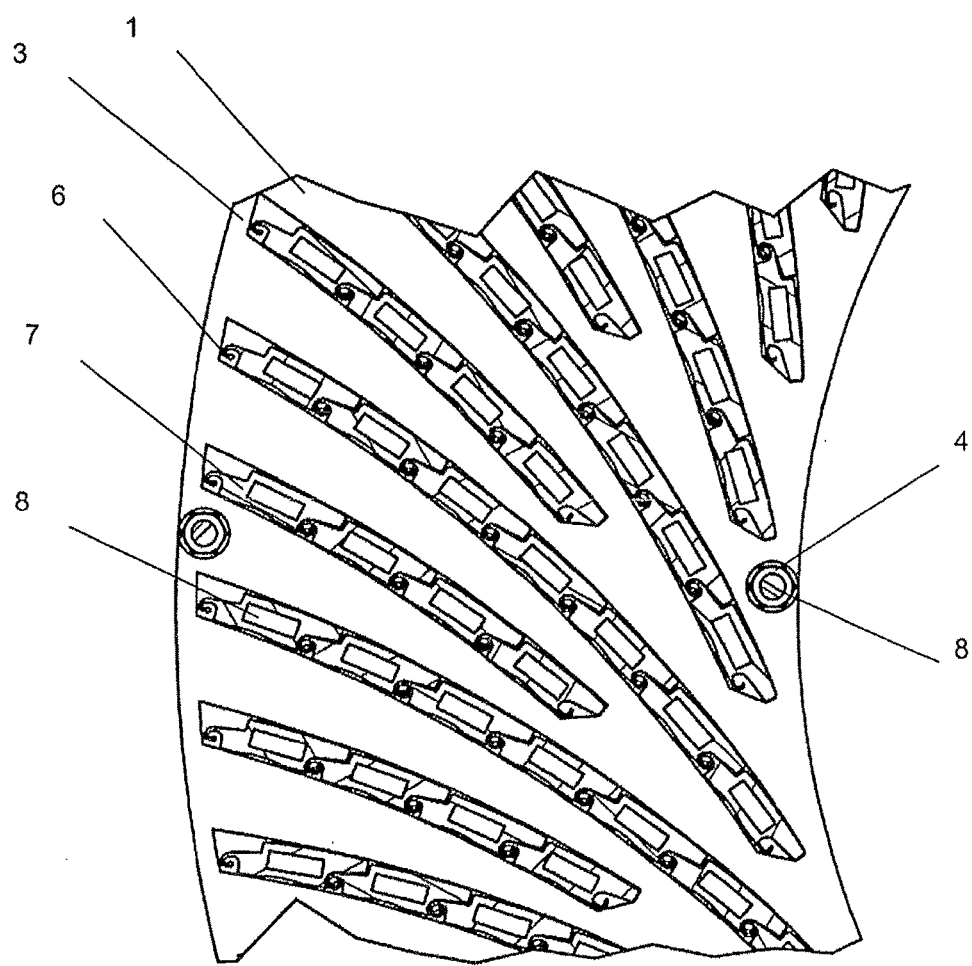

FIG. 2 shows a detail enlargement of FIG. 1, whereby the lamellae 3 on the recesses of the fixation element 1 consist of multiple elements 7, which are connected with one another by means of connecting joints 6, whereby the elements 7 have cavities 8 in which fillings are present, which, in the event that parts of the flywheel mass 2 are accelerated into the safety device, rapid braking of these parts is guaranteed.

As the perspective representation in FIG. 3 shows, the safety container has an upper and a lower cover 10, which are connected with one another by means of the connecting rods 9, whereby two fixation elements 1 are disposed between the upper and the lower cover 10 in the present example, which elements hold the lamellae 3 in their interstices. As FIG. 2 shows, filling or damping elements 8 can be disposed not just in the cavities of the individual elements 7, but rather also between the holes of the fixation elements and the connecting rods 9 situated in them. The safety container, which is shown in perspective in FIG. 3, can also be structured in segment manner, i.e. not only the cover rings 10 but also the fixation elements 1 are composed of individual sections or segments.

The safety container of FIG. 3 can advantageously be used in the solution according to the invention, like the flywheel storage unit, for example as a rotor unit having an internal rotor with a cryocooler 18, as shown in the schematic representation in FIG. 4. This FIG. 4 shows the flywheel mass 2, which rotates about the shaft 17 and is disposed in a vacuum container 11, in which a vacuum 12 is situated. The shaft 17 has a rotor unit 15 of the bearing on both sides, whereby the bearing has superconducting elements 16 in an edging 14, on both sides, which edging represents a cooling mantle of the superconducting bearing and is cooled by means of a cryocooler 18, which is situated outside of the vacuum container 11. The cold is brought from the cryocooler 18 to the bearing by means of a cooling connection 19 in the cryocooler 18 of the edging of the bearing 14, whereby suspensions 13 are disposed on both sides between the vacuum container 11 and the edgings 14 of the cooling mantle. A heating unit 38 is disposed on the superconducting bearing. The safety container consists of the lamellae 3, fixation elements 1, and cover rings 10, and surrounds the flywheel mass 2 in protective manner, for which purpose the safety container is attached to the vacuum container 11 by way of a holding structure 22. In advantageous manner, this attachment between safety container and vacuum container 11 is structured in such a manner that the safety container can rotate along in the holding structure, so that the energy of parts that are accelerated away from the flywheel mass 2 can be absorbed more quickly, without the safety container being destroyed.

As an essential part of the flywheel storage unit, the electrical machine 24 with its holding structure 23 is provided, whereby the holding structure 23 connects the electrical machine 24 with the vacuum container 11. The rotor unit 26 of the electrical machine 24 and the stator unit 25 are situated disposed opposite the electrical machine 24 on the shaft 17.

In particularly advantageous manner, a cold surface 21 is disposed on the edging 14 and the cooling mantle of the superconducting bearing, on which surface gas particles in the vacuum freeze and thereby increase or stabilize the vacuum. The cold surface 21 has an insulation 20 on its back side. In this way, the cold surface is prevented from losing energy in this direction. The cold surface 21 also has a heating unit 36.

FIG. 5 shows the solution according to the invention as a flywheel storage unit that is structured as a rotor unit having an outer rotor with cryocooler 18. The entire apparatus is situated in a vacuum container, whereby at least one flywheel 2 is disposed on a shaft 17 that surrounds the edging 14 of the cooling mantle with the superconducting elements of the bearing 16 at its ends and has the rotor unit 15 of the bearing in this region. The edging of the cooling mantle 14 is connected with the vacuum container, by way of the suspension 13, on both sides. The cryocooler 18 is situated outside of the housing and has a cooling connection 19 to the bearing. The flywheel mass 2 is surrounded by a safety container in the present case, too, which container consists of lamellae 3, fixation elements 1, and cover rings 10, and is connected with the vacuum container 11 by way of the holding structure 22. In the present exemplary embodiment, as well, cooling surfaces 21 having an insulation 20 are provided, in advantageous manner, whereby the cooling surfaces 21 are provided with a cooling connection 27 for the edging 14 for the cooling mantle. A rotor unit 26 is disposed on the flywheel mass 2, which unit lies opposite the stator unit 25 of the electrical machine 24. In this embodiment the electrical machine 24 represents an external rotor. The electrical machine 24 is connected with the vacuum container 11 by means of a holding structure 23.

A further advantageous embodiment variant is shown in a schematic representation by FIG. 6, in which a flywheel storage unit with flywheel mass 2 is shown, and the rotor unit is structured as an external rotor. In this embodiment the electrical machine 24 represents an external rotor. Cryocontainer 18, cold surface 21 and its insulation 20, as well as cooling connection 27 are structured in analogous manner to FIG. 5. The same holds true for the safety container around the flywheel mass, whereby the flywheel mass 2 has a rotor unit 26 on both sides, opposite which stator units 25 of the electrical machine 24 are disposed, whereby the electrical machine 24 is disposed on both sides of the safety container and are connected with the vacuum container 11 by way of the holding structure 23. In other words, the flywheel storage unit has multiple electrical machines 24.

In a further exemplary embodiment, which is shown in FIG. 7, the solution of the flywheel storage unit according to the invention is shown without a safety container, whereby the cooling surfaces 21 are provided with an insulation 20, and stand in connection with the chamber 28 for liquid nitrogen 29 for cooling, in other words it is not a cryocooler but rather a cryogenic agent that ensures cooling of the cold surface 21. The rotor unit 26 is structured as an internal rotor, in other words rotor units 26 are disposed opposite the stator units 25 of the electrical machine 24 on the shaft 17, which is connect connected with the vacuum container 11 by way of the holding structure 23. The superconducting elements 16 lie opposite the rotor unit 15 of the bearing on both sides and shaft 17 on both sides, whereby in this case, too, the edging 14 of the superconducting bearing is connected with the vacuum container 11 by way of the suspension 13.

FIG. 8 shows a schematic representation of the flywheel storage unit according to FIG. 4 supplemented with an external structure 42 that suppresses undesired vibration modes of the system. The container 11, i.e. the housing, is attached in an external structure 42 that suppresses undesired vibration modes of the system.

LIST OF REFERENCE SYMBOLS USED 1 fixation element with recesses
2 flywheel mass
3 lamella
4 hole for connecting rod
5 recess for insertion into holding structure
6 connecting joint between elements
7 element
8 cavity or fill volume of the element
9 connecting rod of the safety container
10 cover ring
11 vacuum container
12 vacuum
13 suspension of the superconducting bearing
14 edging and cooling mantle of the superconducting bearing
15 rotor unit of the bearing
16 superconducting elements of the bearing
17 shaft
18 cryocooler
19 cooling connection of the bearing
20 insulation of the cold surface
21 cold surface
22 holding structure of the safety container
23 holding structure of the electrical machine
24 electrical machine
25 stator unit of the electrical machine
26 rotor unit of the electrical machine
27 cooling connection of the cold surface
28 chamber for liquid nitrogen
29 liquid nitrogen
30 insulating suspension of the chamber
36 heating unit
38 heating unit
42 external structure that suppresses undesired vibration modes

The invention claimed is:

1. An apparatus for storing and releasing energy, comprising a housing that can be evacuated, having a vacuum (12) with a vacuum container (11), at least one flywheel mass (2) on a shaft (17), at least one passive superconducting radial bearing, as well as an electrical machine (24) that represents both a motor and a generator, wherein
    a cold surface (21) is disposed in the vacuum container (11) to stabilize the vacuum (12)
    wherein
    the cold surface (21) has
        an insulation (20)
        or a heating unit or
        an insulation (20) and a heating unit.

2. The apparatus according to claim 1, wherein the cold surface (21) stands in connection with a cryocooler (18) or with a chamber (28) containing liquid nitrogen (29).

3. The apparatus according to claim 1, wherein the cold surface (21) is disposed radially relative to the flywheel mass (2) and/or radially relative to the superconducting bearing(s).

4. The apparatus according to claim 1, wherein one of the bearings is structured as a permanent magnet bearing.

5. The apparatus according to claim 1, wherein one bearing is configured as an internal rotor and one bearing as an external rotor.

6. The apparatus according to claim 1, wherein both bearings are configured either as internal or as external rotors.

7. The apparatus according to claim 1, wherein a heating unit is disposed on the superconducting bearing.

8. The apparatus according to claim 1, wherein at least one permanent magnet is disposed on the rotor unit (26) of the electrical machine (24).

9. The apparatus according to claim 1, wherein the electrical machine (24) represents an external rotor.

10. The apparatus according to claim 9, wherein the flywheel storage unit has multiple electrical machines (24).

11. The apparatus according to claim 1, wherein the electrical machine (24) represents an internal rotor.

12. The apparatus according to claim 1, wherein a safety container comprising at least one fixation element (1), lamellae (3), cover rings (10) or cover elements and connection parts is disposed around the flywheel mass (2).

13. The apparatus according to claim 12, wherein the safety container is connected with the holding structure (22) of the vacuum container (11) in free-running manner.

14. The apparatus according to claim 1, wherein the housing is attached in an external structure that suppresses undesired vibration modes of the system.

15. An apparatus for storing and releasing energy, comprising a housing that can be evacuated, having a vacuum with a vacuum container, at least one flywheel mass on a shaft, at least one passive superconducting radial bearing, as well as an electrical machine that represents both a motor and a generator, wherein a cold surface is disposed in the vacuum container to stabilize the vacuum,
    wherein the passive superconducting radial bearing comprises a cooling mantle and wherein the cold surface to stabilize the vacuum, which cold surface is provided separate from the cooling mantle, is connected with a cold source or with the cooling mantle of the superconducting bearing.

* * * * *